INVENTOR
SAMUEL CHARLES FISHER
BY
Brown, Critchlow,
Flick & Peckham
ATTORNEYS 3,504,985
WAVE MOTOR
Samuel Charles Fisher, Apt. 302A1, 1810 National Road
Wheeling, W. Va. 26003
Filed Mar. 18, 1968, Ser. No. 713,856
Int. Cl. F03b 13/12; F04b 17/00, 35/00
U.S. Cl. 415—5                                    10 Claims

ABSTRACT OF THE DISCLOSURE

An elongated frame, supported by a standard adapted to be rigidly mounted in a body of water with the frame extending away from the shore, supports sprockets at its opposite ends. Extending around the sprockets is an endless chain on which buckets are mounted. The frame can be raised and lowered to locate the buckets carried by the lower length of the chain at a level where waves will move them toward the shore intermittently. A speed-increasing unit on the frame is driven from one of the sprockets and in turn drives a flywheel through an overrunning clutch.

It is among the objects of this invention to provide a wave motor, which can be raised and lowered to take the best advantage of the waves beneath it, and which has a power output member that is rotated at a substantially constant speed.

The preferred embodiment of the invention is illustrated in the accompanying drawings, in which FIG. 1 is a side view of my wave motor;

FIG. 4 is an enlarged fragmentary vertical section taken on the line IV—IV of FIG. 1; and FIG. 5 is an enlarged fragmentary horizontal section taken on the line V—V of FIG. 1.

Figure 1:
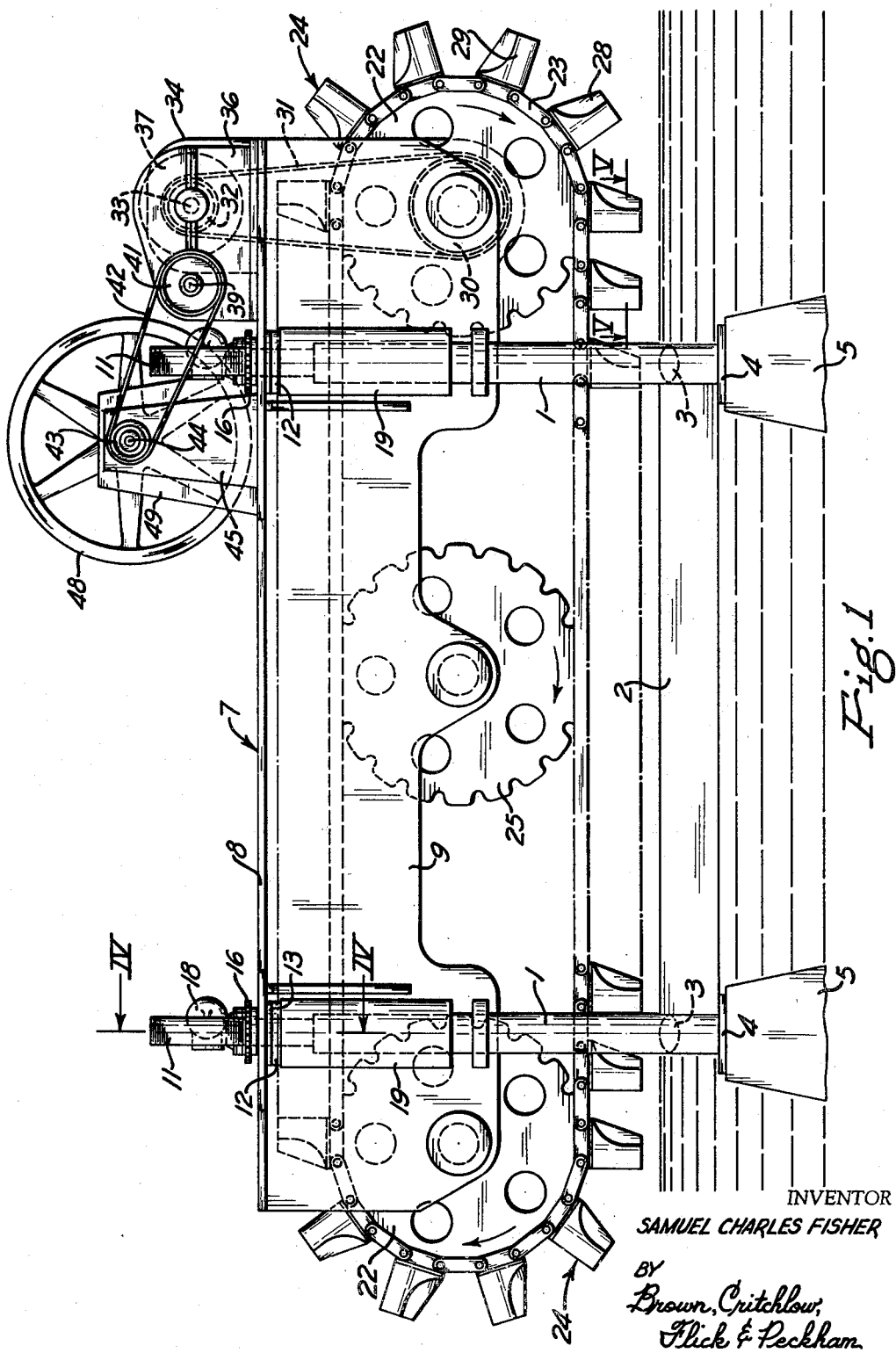
Figure 2:
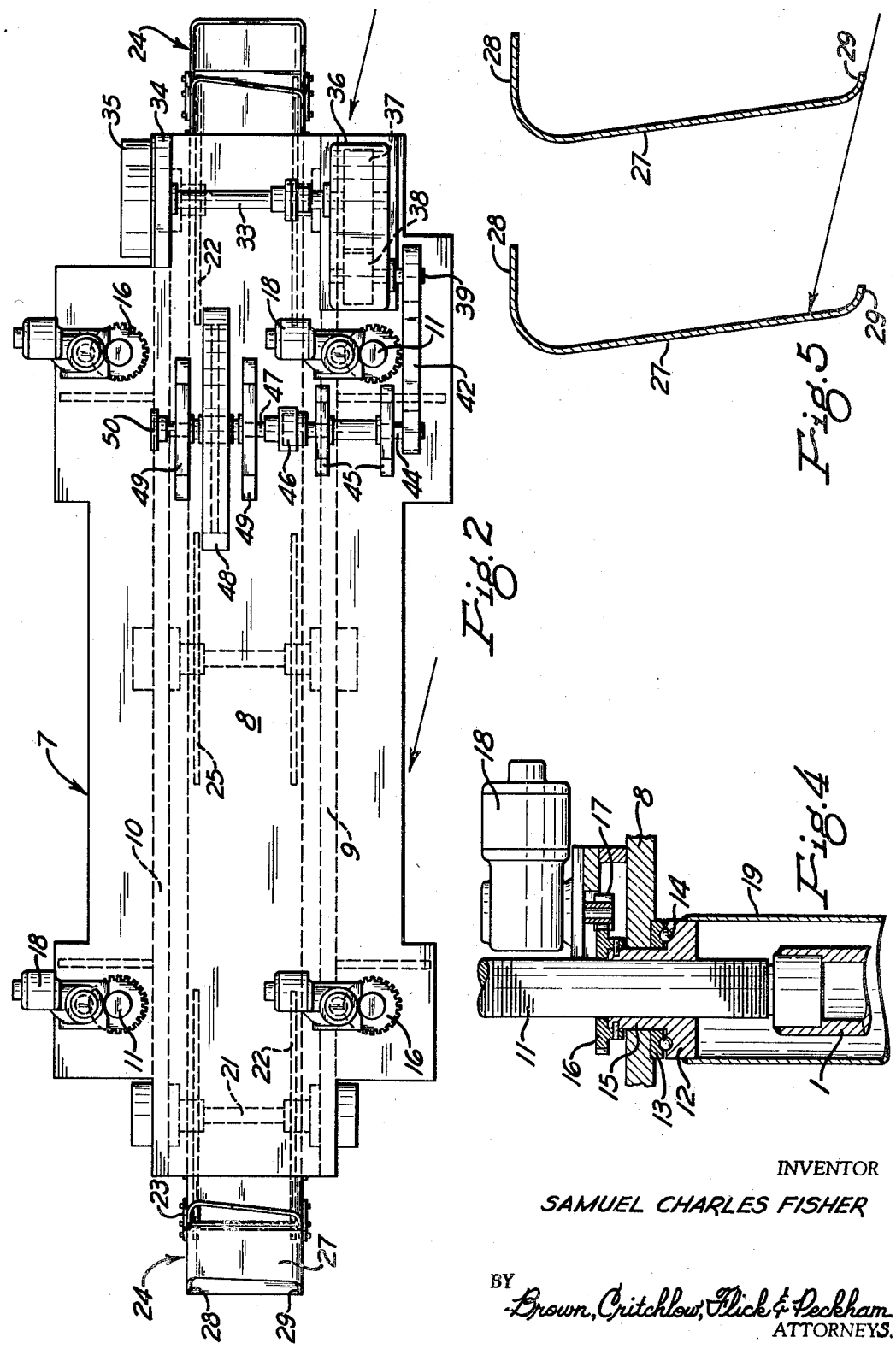
FIG. 2 is a plan view thereof.
Figure 3:
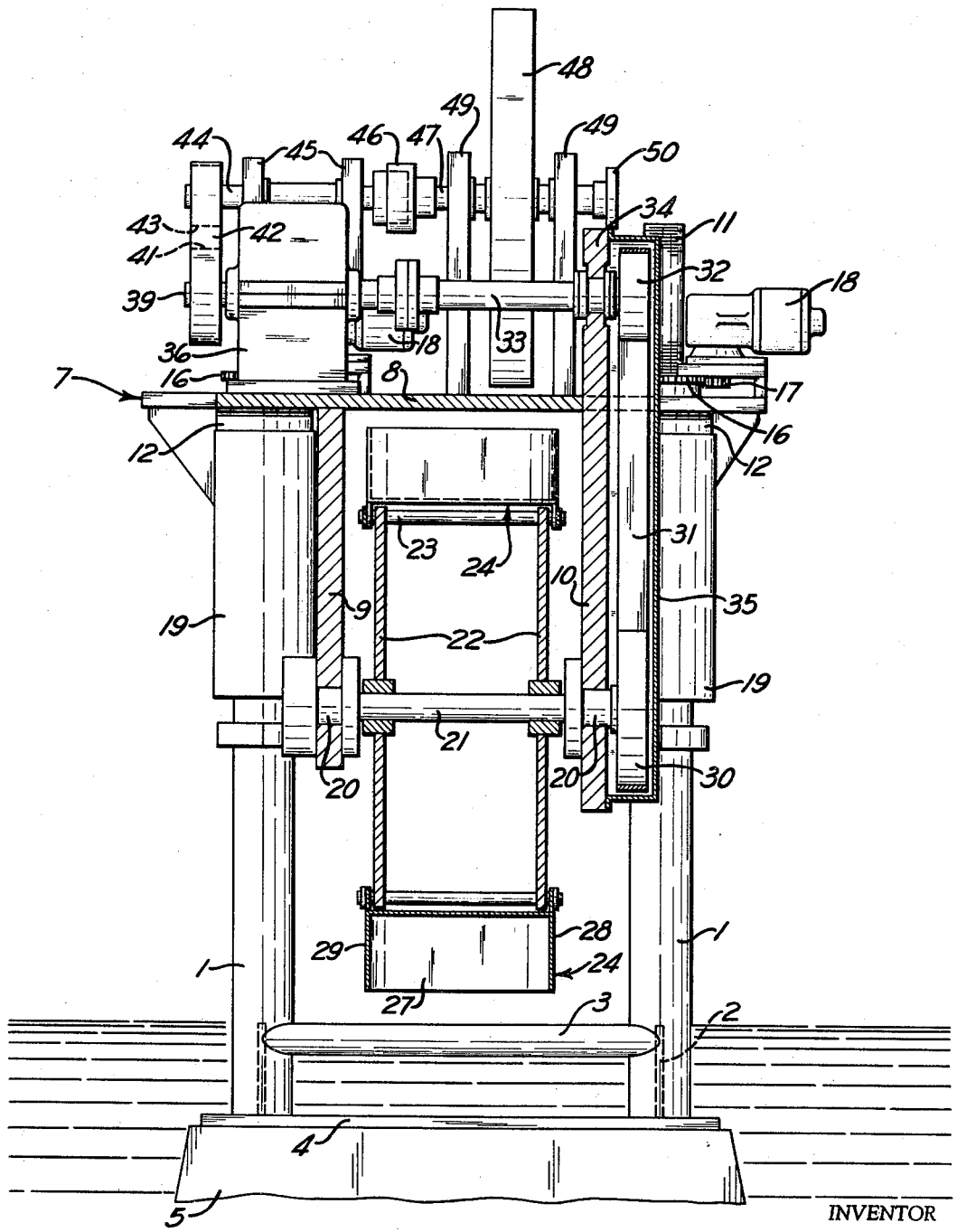
FIG. 3 is an enlarged end view with parts broken away.

Referring to FIGS. 1, 2 and 3 of the drawings, a rigid rectangular standard has four corner posts 1 connected together at their lower ends by longitudinal and transverse members 2 and 3. Secured to the bottoms of the posts are horizontal end plates 4 that can be bolted down to concrete foundation blocks 5 or the like securely mounted in the bed of a body of water that always has waves moving across it toward the shore. The standard extends lengthwise away from the shore and is located in the water only far enough out to make sure that the waves always can be utilized for power, even at low tide.

The standard just described supports an elongated frame 7 that extends lengthwise of the standard. The frame preferably includes a long top plate 8 and a pair of downwardly extending parallel side plates 9 and 10. The ends of the frame extend beyond the ends of the standard, and the top plate extends laterally over the posts. The side plates are between the posts.

Directly over each post the top plate of the frame is provided with an opening, up through which extends a stationary threaded screw 11 as shown in FIG. 4. The lower end of the screw is rigidly mounted in the top of the underlying post. Threaded on each screw is a nut 12 that extends laterally beneath a bearing ring 13 secured to the bottom of the top plate. Ball bearings 14 separate the ring and nut. Consequently, the top plate is supported by the four nuts on the four vertical screws. Each nut preferably has an upwardly extending hub 15 that extends up through the plate far enough for a gear 16 to be rigidly mounted on its upper end. Each gear can be turned by a pinion 17 driven by any suitable common drive or by an electric gear motor 18 mounted on top of the plate beside the screw. When all of the gears are turned in unison, the nuts are screwed up or down the screws in order to raise or lower frame 7 relative to its supporting standard. To help protect the screws beneath the top plate 8 from the water, sleeves 19 may encircle them with the upper ends of the screws welded to nuts 12.

The end portions of side plates 9 and 10 support bearings 20, in which a pair of parallel sprocket shafts 21 are rotatably mounted. Secured to each shaft between the side plates is a sprocket 22 that may be formed from two laterally spaced sprocket plates as shown in FIG. 3. Extending around these end sprockets is an endless conveyor chain 23 that supports a plurality of buckets 24 for driving the chain. The central portion of the chain preferably is supported by one or more sprockets 25 (FIG. 1) also journalled in the side plates of the frame.

Referring to the buckets on the lower length of the chain for descriptive purposes, and to FIG. 5 in particular, it will be seen that each one is welded to the chain and has a downwardly extending front wall 27 extending across the chain. To the opposite ends of the front walls there are side walls that extend a short distance rearwardly along the chain. For a purpose that will be described presently, the side walls 28 at one side of the chain are wider than those 29 at the opposite side, whereby the space between the buckets at one side is greater than at the other side. The frame is adjusted vertically on the standard to locate the buckets on the lower length of the chain at a level where waves will enter them and push them toward the shore, thereby driving the chain intermittently. For best results, the lower row of buckets should be located partly or completely above the normal water level, such as indicated in FIG. 1, but not so far above it that they are not engaged by the waves when they roll in. The elevation of the frame has to be changed periodically to compensate for the tide.

For best operating results, the standard and frame are not disposed parallel to the direction of travel or flow of the waves, as indicated by the arrows in FIGS. 2 and 5, but are set at a slight angle to it, such as at an angle between about 10 and 20 degrees. This will permit the waves to enter the buckets from one side as well as from the back so that there is less obstruction by each bucket of the one ahead of it. The frame 7 is positioned with the short wall sides 29 of the bucket at the side of the frame where the waves enter the buckets because the buckets are further apart at that side. Also, for the greatest efficiency, it is desirable that the front walls of the buckets extend obliquely forward across the chain from the short side walls, as shown in FIG. 5. The water entering the buckets will then exert pressure along the entire length of the front walls with a minimum of turbulence. If the front walls are perpendicular to the length of the chain, most of the water pressure will be against the ends of the front walls carrying the narrow side walls 29, and there will be more turbulence, resulting in reduced bucket effectiveness.

As the waves move toward the shore they engage the buckets on the lower length of the chain and carry them in the same direction, thereby driving the chain which in turn rotates the sprockets. The shaft of one sprocket projects out beyond one side of the frame and supports a pulley 30. Preferably, this is the sprocket farthest from the shore, because the lower length of the chain will pull on that sprocket. The pulley is encircled by a belt 31 that extends up above the frame and around a smaller pulley 32 mounted on a shaft 33 journalled at one end in an upwardly projecting portion 34 of frame side plate 10. The belt and pulleys are enclosed in a case 35 secured to the side of the side plate.

The other end of shaft 33 extends through the housing 36 of a speed increasing unit, containing two meshing gears 37 and 38 (FIG. 2). The shaft drives the larger of the two gears. The projecting shaft 39 of the small gear extends out of the housing and supports a pulley 41. This pulley is connected by a belt 42 to a smaller pulley 43 on the outer end of a shaft 44 that is journalled in a pair of upstanding supports 45 mounted on the frame. The inner end of this shaft is connected through an over-running clutch 46 of any suitable well-known construction to one end of the shaft 47 of a heavy flywheel 48 rotatably mounted in bearing members 49 above the frame. The other end of the flywheel shaft is equipped with a power output coupling 50, by which it can deliver power to a generator or anything else that is to be driven by this wave motor.

It will be seen that my wave motor is so constructed and operated that it can deliver substantially constant power in spite of the intermittent action of the waves. Also, it can be adjusted vertically to maintain the lower line of buckets in the best position for movement by the waves. The shape of the buckets and their position relative to the incoming waves are such that they receive the greatest possible power from the waves.

According to the provisions of the patent statutes, I have explained the principle of my invention and have illustrated and described what I now consider to represent its best embodiment.

I claim:

1. A wave motor comprising a standard adapted to be rigidly mounted in a body of water having waves moving toward the shore, an elongated frame supported by the standard and adapted to extend away from the shore, vertical sprockets journalled in the opposite ends of the frame, an endless chain extending around the sprockets for driving them, buckets mounted on the chain, means for raising and lowering the frame on the standard to locate the buckets carried by the lower length of the chain at a level where waves will move them forward toward the shore intermittently to drive the chain, a speed-increasing unit mounted on the frame, means for driving said unit from one of the sprockets, a flywheel rotatably mounted on the frame, means for driving the flywheel from said unit and including an over-running clutch so that the flywheel can rotate at a substantially constant speed while the chain is being driven intermittently, and a power output member driven by the flywheel.

2. A wave motor according to claim 1, in which said frame has a horizontal top plate supporting said speed-increasing unit and flywheel and flywheel-driving means, and also has downwardly extending side plates rotatably supporting said sprockets.

3. A wave motor according to claim 1, in which said standard includes posts at opposite sides of said frame and vertical screws rigidly mounted on the upper ends of the posts and extending up through the frame, and said raising and lowering means include nuts threaded on said screws and supporting the frame, and means supported by the vertically movable frame for turning the nuts.

4. A wave motor according to claim 3, in which said nuts have portions extending up through the top of the frame, said said nut-turning means include gears rigidly mounted on the upper ends of said nut portions, pinions meshing with the gears, and means for driving the pinions.

5. A wave motor according to claim 3, including protective sleeves encircling said screws below said nuts and rigidly connected at their upper ends to the nuts.

6. A wave motor according to claim 1, in which each of said buckets on the lower length of the chain has a downwardly extending front wall extending across the chain and terminating in side walls extending back lengthwise of the chain, the side walls of the buckets at one side of the chain being wider than the side walls at the opposite side of the chain, whereby the spacing between the buckets is greater at one side than at the other.

7. A wave motor according to claim 6, in which said bucket front walls extend obliquely forward across the chain from their narrow side walls.

8. A wave motor according to claim 1, in which the buckets on the lower length of the chain have parallel downwardly extending front walls extending obliquely across the chain, and rearwardly extending side walls at the ends of the front walls, the side walls at the forward ends of the front walls being wider than the side walls at the other ends of the front walls.

9. A wave motor comprising an elongated frame adapted to be located above a body of water having waves moving toward the shore, said frame having a top plate adapted to extend away from the shore and also having downwardly extending side plates, posts at opposite sides of said frame, vertical screws rigidly mounted on the upper ends of the posts and extending up through said top plate, nuts threaded on said screws and supporting the frame, vertical sprockets beneath the top plate journalled in the opposite ends of said side plates, an endless chain extending around the sprockets for driving them, buckets mounted on the chain, the buckets on the lower length of the chain having parallel downwardly extending front walls extending across the chain and rearwardly extending side walls at the ends of the front walls, the bucket side walls at one side of the frame being wider than the side walls at the other side, means on the frame for turning said nuts to raise and lower the frame relative to the posts in order to locate the buckets carried by the lower length of the chain at a level where waves will move them forward toward the shore intermittently to drive the chain, a speed-increasing unit mounted on top of said top plate, means for driving said unit from one of the sprockets, a flywheel rotatably mounted on top of said top plate, means for driving the flywheel from said unit and including an over-running clutch so that the flywheel can rotate at a substantially constant speed while the chain is being driven intermittently, and a power output member driven by the flywheel.

10. A wave motor according to claim 9, in which said front walls of the buckets extend obliquely across the chain, and said side walls are at the forward ends of the front walls.

References Cited

UNITED STATES PATENTS

| 1,831,097 | 11/1931 | David | 253—4 X |
| 2,379,314 | 6/1945 | Merritt | 103—63 X |

EVERETTE A. POWELL, JR., Primary Examiner

U.S. Cl. X.R.

230—64; 103—67; 416—7